United States Patent
Lee

(10) Patent No.: US 6,864,881 B2
(45) Date of Patent: Mar. 8, 2005

(54) KEY SWITCH-REPLACEABLE KEYBOARD MOUNTING ARRANGEMENT

(75) Inventor: Yung-Tang Lee, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 253 days.

(21) Appl. No.: 10/155,037

(22) Filed: May 28, 2002

(65) Prior Publication Data

US 2003/0222852 A1 Dec. 4, 2003

(51) Int. Cl.[7] .............................................. G09G 5/00
(52) U.S. Cl. ...................... 345/168; 345/169; 200/5 A; 200/5 B; 200/5 C; 200/5 D; 200/5 E; 200/5 F; 400/472; 400/473
(58) Field of Search ................................. 345/168, 169; 200/5 E, 5 D; 400/472

(56) References Cited

U.S. PATENT DOCUMENTS

| | | | | |
|---|---|---|---|---|
| 4,124,313 A | * | 11/1978 | Schmidt et al. | .......... 400/491.2 |
| 6,333,734 B1 | * | 12/2001 | Rein | .......................... 345/169 |
| 6,575,647 B1 | * | 6/2003 | Daniel | ........................ 400/472 |

* cited by examiner

Primary Examiner—Dennis-Doon Chow
Assistant Examiner—Ming-Hun Liu
(74) Attorney, Agent, or Firm—Bacon & Thomas PLLC

(57) ABSTRACT

A key switch-replaceable keyboard mounting arrangement. The arrangement includes a keyboard shell having an array of contacts on its inside. Rows of keys are suspended in the keyboard shell and adapted for triggering the contacts to produce a signal. Resilient locating plates are coupled to the keyboard shell at two sides of each row of keys and moved between a first position to hold down the keys in place for operation, and a second position to disengage the keys for a replacement.

8 Claims, 3 Drawing Sheets

KEY SWITCH-REPLACEABLE KEYBOARD MOUNTING ARRANGEMENT

BACKGROUND OF THE INVENTION

1. Field of the Invention

The present invention relates to a keyboard and, more specifically, to a key switch-replaceable keyboard mounting arrangement for an electronic apparatus, which enables the user to conveniently change the arrangement of key switches.

2. Description of Related Art

A conventional keyboard is generally comprised of a set of key switches, each key switch corresponding to a respective input signal. When the user depressed one key switch, the key switch is triggered to input a character (symbol), or an instruction to move the cursor on the screen. According to conventional designs, the arrangement of the key switches of a keyboard is not changeable. Because the arrangement of the key switches is not changeable, the user may feel inconvenient when using certain application software. For example, when a child uses the keyboard at the first time to run an educational application software, the child may be afraid of learning the teaching from the computer due to the complicated arrangement of the key switches. Further, when using a computer to play a game, the user needs only to operate the key switches in the keypad of the keyboard or a limited number of the key switches. However, it is inconvenient to operate a limited number of the key switches in one corner of the keyboard.

Therefore, it is desirable to provide a keyboard that enables the user to change the arrangement of the key switches conveniently.

SUMMARY OF THE INVENTION

The present invention has been accomplished under the circumstances in view. It is therefore the main object of the present invention to provide a keyboard mounting arrangement for electronic apparatus, which enables the user to replace the key switches. To achieve this and other objects of the present invention, the key switch-replaceable keyboard mounting arrangement comprises a keyboard shell provided in an electronic apparatus, the keyboard shell having a plurality of sliding slots symmetrically disposed in two opposite sidewalls thereof and a plurality of contacts disposed at a bottom side; a plurality of keys suspended in the keyboard shell above the contacts and adapted for triggering the contacts to output signal, the keys each having two coupling grooves at two sides; and a plurality of elongated resilient locating plates respectively mounted in the keyboard shell and arranged in parallel and adapted to hold the keys above the contacts, the locating plates each having two opposite sides respectively engaged into the coupling grooves of the keys and two pins axially extended from two distal ends thereof and respectively inserted into the sliding slots of the keyboard shell for enabling the locating plates to be respectively moved in the sliding slots of the keyboard shell between a first position to hold the corresponding keys in position and a second position to disengage the corresponding keys for a replacement.

DETAILED DESCRIPTION OF THE PREFERRED EMBODIMENT

Figure 1:
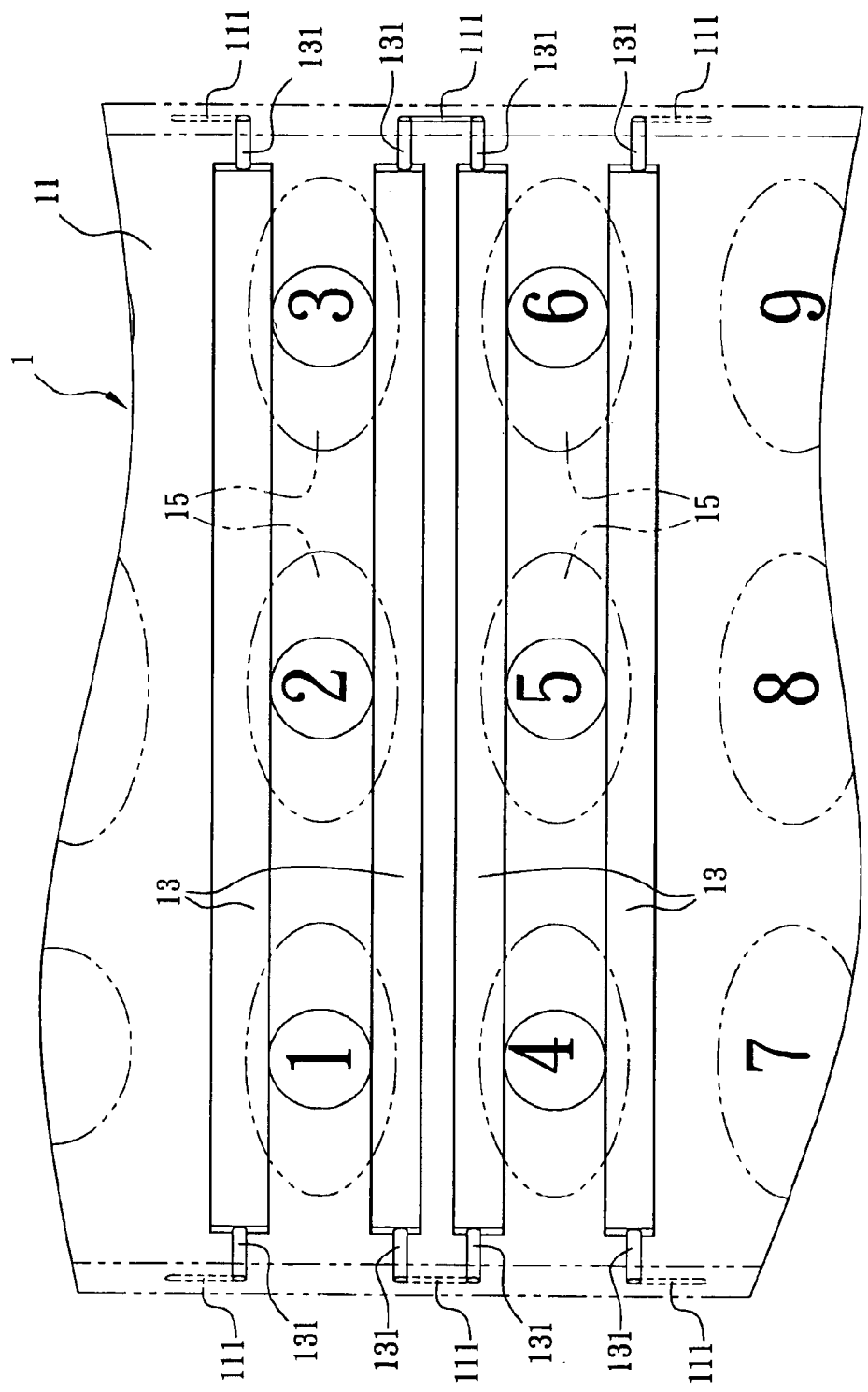
FIG. 1 is a top plain view of the preferred embodiment of the present invention.
Figure 2:
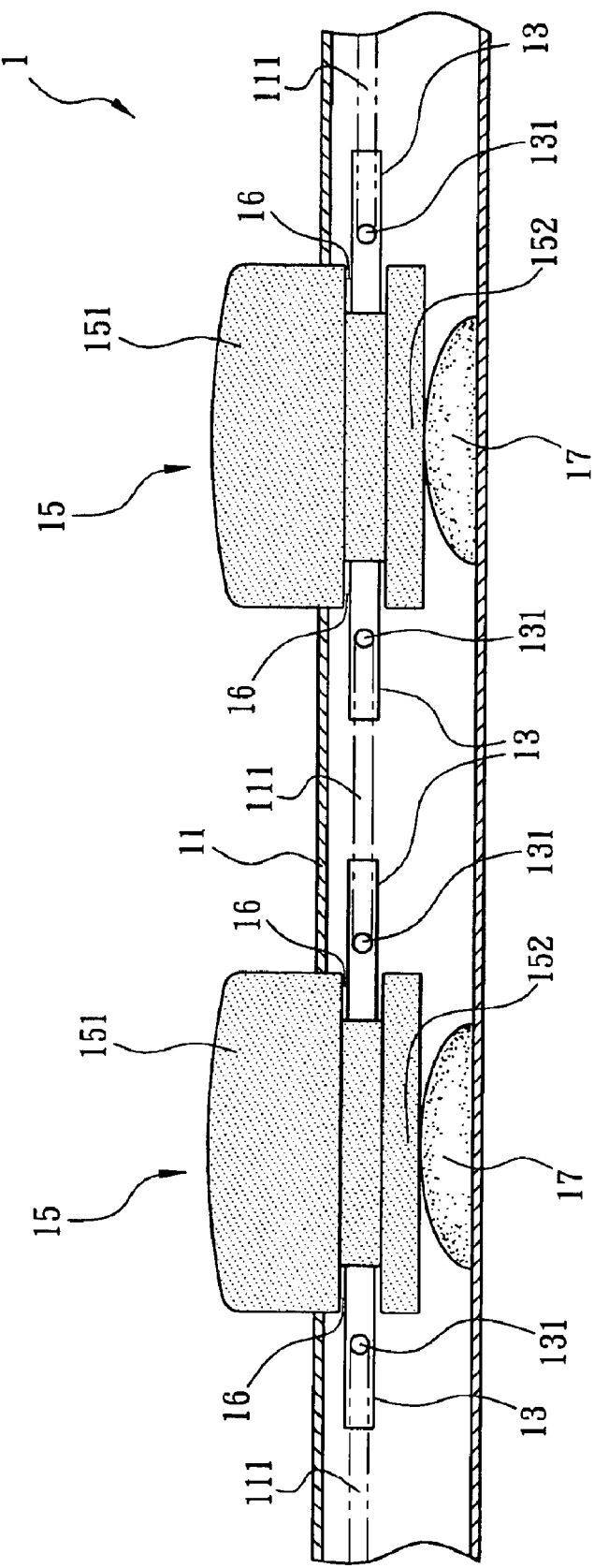
FIG. 2 is a side view in section in an enlarged scale of a part of FIG. 1.

Referring to FIGS. 1 and 2, an electronic apparatus 1 (for example, notebook computer, PDA, etc.) is shown comprising a keyboard shell 11, a plurality of contacts 17 provided in the keyboard shell 11 at the bottom side, a plurality of elongated resilient locating plates 13 respectively mounted inside the keyboard shell 11 at a higher elevation than the contacts 17 and arranged in parallel, and a plurality of keys 15 respectively coupled in between each two adjacent locating plates 13. The keys 15 each have two coupling grooves 16 disposed at two sides and respectively coupled to the locating plates 13. The locating plates 13 each have two pins 131 axially disposed at two distal ends and respectively coupled to respective sliding slots 111 in two opposite sidewalls of the keyboard shell 11.

Figure 3:
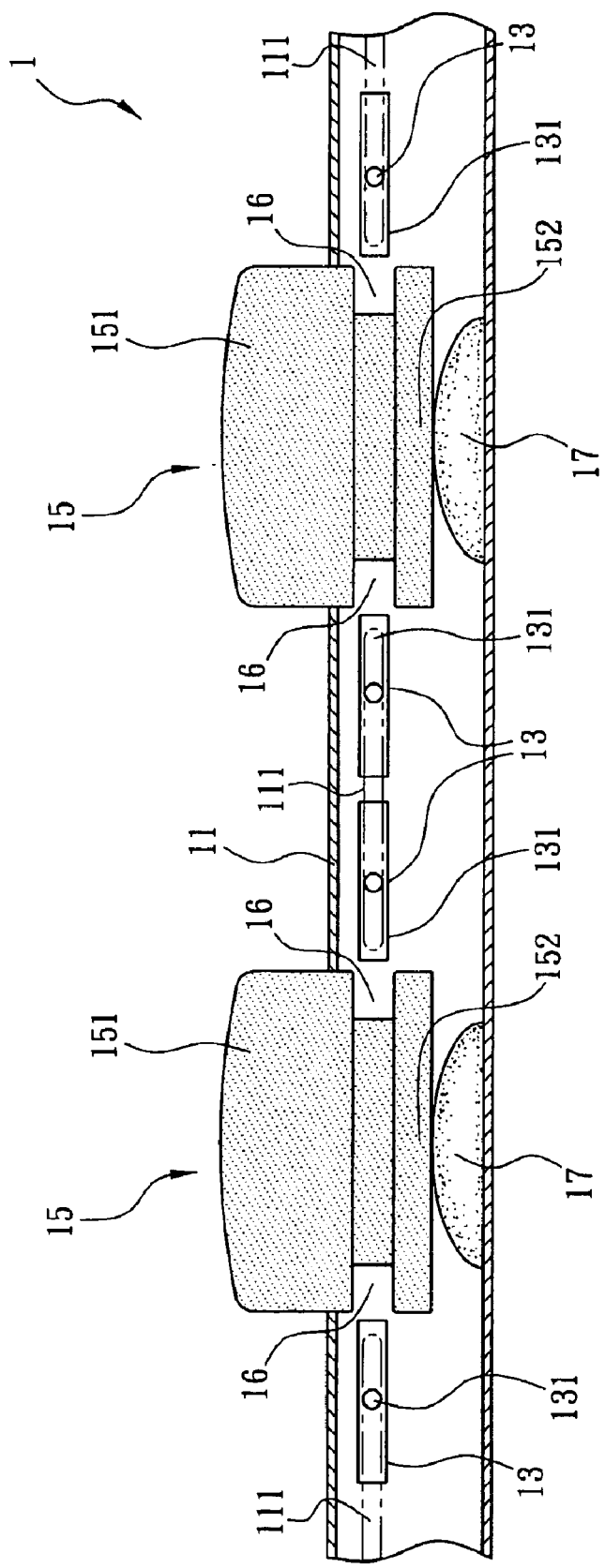
FIG. 3 is similar to FIG. 2 but showing the locating plates disengaged from the coupling grooves of the keys.

Referring to FIG. 3, when moving the respective locating plates 13 leftwards or rightwards away from the respective keys 15, the respective keys 15 are unloaded for a replacement.

Referring to FIGS. 1 and 2 again, the locating plates 13 are resilient. When the user pressed one key 15, the corresponding two locating plates 13 are curved inwards, enabling the key 15 to trigger the corresponding contact 17, causing the corresponding contact 17 to output signal. When the user released the finger from the key 15, the corresponding two locating plates 13 immediately return to their former shape, lifting the key 15 from the corresponding contact 17.

In an alternate form of the present invention, one key 15 may be adapted to trigger multiple contacts 17, i.e., when the user depressed one key 15, the key 15 triggers multiple contacts 17. Further, the keys 15 can be made having a cylindrical, rectangular, or triangular shape, or any of a variety of shapes.

Referring to FIG. 2 again, each key 15 comprises a head 151 disposed at the top, a contact portion 152 disposed at the bottom in contact with one or a number of contacts 17, and two coupling grooves 16 in two opposite lateral sidewalls thereof and coupled to the corresponding locating plates 13.

Referring to FIGS. 1 and 2 again, the contacts 17 of the electronic apparatus 1 are arranged in an array, and respectively connected to the CPU (not shown) of the electronic apparatus 1 by a respective conductor so that the CPU can scan signals produced by the contacts 17.

Referring to FIGS. 2 and 3 again, when replacing the keys 15, the user can move the locating plates 13 in two directions along the respective sliding slots 111 to disengage the locating plates 13 from the keys 15. After new keys 15 have been put in the keyboard shell 11 and supported on the corresponding contacts 17, the respective locating plates 13 are moved reversely and engaged into the coupling grooves 16 of the new keys 15.

A prototype of key switch-replaceable keyboard mounting arrangement has been constructed with the features of the annexed drawings of FIGS. 1~3. The key switch-replaceable keyboard mounting arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A key switch-replaceable keyboard mounting arrangement comprising:

a keyboard shell provided in an electronic apparatus, said keyboard shell having a plurality of sliding slots symmetrically disposed in two opposite sidewalls thereof and a plurality of contacts disposed at a bottom side thereof;

a plurality of keys suspended in said keyboard shell above said contacts and adapted for triggering said contacts to output a signal, said keys each having two coupling grooves at two sides thereof; and a plurality of elongated resilient locating plates respectively mounted in said keyboard shell and arranged in parallel and adapted to hold said keys above said contacts, said locating plates each having two opposite sides respectively engaged into the coupling grooves of said keys and two pins axially disposed at two distal ends thereof and respectively coupled to respective ones of the sliding slots of said keyboard shell in the two opposite side walls of the keyboard shell for enabling said locating plates to be respectively moved in said sliding slots of said keyboard shell between a first position to hold the corresponding keys in position and a second position to disengage the corresponding keys for replacement.

2. The key switch-replaceable keyboard mounting arrangement as claimed in claim 1, wherein said keys each have a covering area covered over a number of said keys and adapted for triggering a number of said keys.

3. The key switch-replaceable keyboard mounting arrangement as claimed in claim 1, wherein said contacts are arranged in an array, and respectively connected to a central processing unit of said electronic apparatus by a respective conductor for enabling said central processing unit to scan signals produced by said keys.

4. The key switch-replaceable keyboard mounting arrangement as claimed in claim 1, wherein said electronic apparatus is a notebook computer.

5. The key switch-replaceable keyboard mounting arrangement as claimed in claim 1, wherein said electronic apparatus is a PDA (personal digital assistant).

6. The key switch-replaceable keyboard mounting arrangement as claimed in claim 2, wherein said keys have a cylindrical shape.

7. The key switch-replaceable keyboard mounting arrangement as claimed in claim 2, wherein said keys have a rectangular shape.

8. The key switch-replaceable keyboard mounting arrangement as claimed in claim 2, wherein said keys have a triangular shape.

* * * * *